United States Patent
Hiraoka et al.

(10) Patent No.: US 10,844,447 B2
(45) Date of Patent: Nov. 24, 2020

(54) HEAT TREATMENT METHOD OF ROD-SHAPE WORKPIECE

(71) Applicant: NTN CORPORATION, Osaka (JP)

(72) Inventors: Tsuneaki Hiraoka, Shizuoka (JP); Shintaro Suzuki, Shizuoka (JP); Yuuki Tabuchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 87 days.

(21) Appl. No.: 16/312,368

(22) PCT Filed: May 26, 2017

(86) PCT No.: PCT/JP2017/019812
§ 371 (c)(1),
(2) Date: Dec. 21, 2018

(87) PCT Pub. No.: WO2017/221635
PCT Pub. Date: Dec. 28, 2017

(65) Prior Publication Data
US 2019/0241986 A1    Aug. 8, 2019

(30) Foreign Application Priority Data
Jun. 24, 2016 (JP) .................... 2016-125716

(51) Int. Cl.
*C21D 1/10* (2006.01)
*C21D 9/28* (2006.01)
(Continued)

(52) U.S. Cl.
CPC ............... *C21D 1/10* (2013.01); *C21D 9/28* (2013.01); *C21D 9/36* (2013.01); *F16C 33/34* (2013.01); *Y02P 10/25* (2015.11)

(58) Field of Classification Search
CPC ..................................... C21D 1/10; C21D 9/38
(Continued)

(56) References Cited

U.S. PATENT DOCUMENTS 4,552,091 A * 11/1985 Feder .................... C23C 24/106
118/308
2016/0230243 A1    8/2016 Hiraoka et al.

FOREIGN PATENT DOCUMENTS

CN    202009508    10/2011
CN    105593384    5/2016
(Continued)

OTHER PUBLICATIONS

English Language Translation of JP54-00934 (Year: 1979).*
(Continued)

*Primary Examiner* — Scott R Kastler
(74) *Attorney, Agent, or Firm* — Wenderoth, Lind & Ponack, L.L.P.

(57) ABSTRACT

When a rod-shaped workpiece (W) having an outer peripheral surface with a circular cross section is inductively heated to a quenching temperature while being conveyed at a predetermined velocity along an axial direction of the rod-shaped workpiece (W), the rod-shaped workpiece (W) being currently conveyed is heated to a predetermined temperature equal to or lower than the quenching temperature by a first heating coil (2A), which is electrically connected to a first high-frequency power supply (3) and has a constant output. Then, the rod-shaped workpiece (W) being currently conveyed is heated so as to be maintained at the quenching temperature by a second heating coil (2B), which is electrically connected to a second high-frequency power supply (4) and has a constant output.

7 Claims, 5 Drawing Sheets

(51) Int. Cl.
*C21D 9/36* (2006.01)
*F16C 33/34* (2006.01)

(58) Field of Classification Search
USPC .......................................................... 219/637
See application file for complete search history.

(56) References Cited

FOREIGN PATENT DOCUMENTS

| | | |
|---|---|---|
| JP | 48-93511 | 12/1973 |
| JP | 54-9034 | 1/1979 |
| JP | 59-190329 | 10/1984 |
| JP | 4-218621 | 8/1992 |
| JP | 7-3325 | 1/1995 |
| JP | 10-204524 | 8/1998 |
| JP | 2005-331005 | 12/2005 |

OTHER PUBLICATIONS

International Preliminary Report on Patentability and Written Opinion of the International Searching Authority dated Dec. 25, 2018 in International (PCT) Application No. PCT/JP2017/019812.
Chinese Office Action dated Apr. 9, 2020 in corresponding Chinese Patent Application No. 201780038398.X, with English language translation of the Chinese Search Report.
International Search Report dated Aug. 29, 2017 in International (PCT) Application No. PCT/JP2017/019812.
Extended European Search Report dated Feb. 17, 2020 in corresponding European Application No. 17815104.9.

* cited by examiner

HEAT TREATMENT METHOD OF ROD-SHAPE WORKPIECE

TECHNICAL FIELD

The present invention relates to a heat treatment method for a rod-shaped workpiece.

BACKGROUND ART

A heat treatment (quench hardening) is performed on a mechanical component such as a cylindrical roller or a tapered roller, which requires a high mechanical strength and a high hardness, in a manufacturing process thereof. The heat treatment includes, for example, a heating step of heating a rod-shaped workpiece having an outer peripheral surface with a circular cross section to a predetermined temperature (quenching temperature) and a cooling step of cooling the heated rod-shaped workpiece. The heating step can be carried out using an atmosphere heating furnace such as a mesh-belt type continuous furnace, or an induction heating apparatus including, for example, a high-frequency power supply, a heating coil, and a conveying device configured to move the rod-shaped workpiece relative to the heating coil (for example, Patent Literature 1).

CITATION LIST

Patent Literature 1: JP 2005-331005 A

SUMMARY OF INVENTION

Technical Problem

The rod-shaped workpiece is formed of, for example, a steel material containing carbon at 0.8% by mass or more (for example, SUJ2, which is a kind of high-carbon chromium bearing steel specified in JIS G4805). In this case, in general, the heating step is carried out so that carbon at about 0.6% by mass is dissolved in a metallic structure (austenite) of the workpiece and a residual thereof remains as a carbide. The main reason thereof is as follows. When the amount of dissolution of carbon is set to about 0.6% by mass, the amount of generation of residual austenite, which may cause a problem such as decrease in hardness or aging degradation, can be reduced. Further, when the carbide is caused to remain, growth of crystal grains of austenite during heating can be prevented. In order to control the amount of dissolution of carbon into the workpiece, as shown in FIG. 7, it is effective to heat the workpiece for a predetermined time period t1 until a temperature of the workpiece reaches a predetermined temperature (quenching temperature) T and then heat the workpiece (soak the workpiece) for a predetermined time period t2 so as to maintain the workpiece at the quenching temperature T.

In a case in which the atmosphere heating furnace is used, when an in-furnace temperature and a heat-treatment time period (t1+t2) are adjusted, the workpiece can be heated so that a temperature path shown in FIG. 7 is obtained. In the atmosphere heating furnace, however, a large amount of energy and long time are required to increase the in-furnace temperature to the quenching temperature T. Therefore, there is a disadvantage in terms of cost. Meanwhile, in a case in which the induction heating apparatus is used, only the workpiece can be directly heated, and hence high energy efficiency can be achieved correspondingly. In addition, the heat-treatment time period, which is remarkably shorter than that in the case in which the atmosphere heating furnace is used, is only required. In the induction heating, however, it is difficult to control a temperature of the workpiece. In particular, a technical measure for soaking the workpiece is required to be examined.

A so-called mass-produced item such as the cylindrical roller is desired to be manufacturable with efficiency as high as possible. In view of this fact, the inventors of the present invention have examined (continuous) conveyance of the rod-shaped workpiece at a predetermined velocity along an axial direction of the rod-shaped workpiece at the time of induction heating of the rod-shaped workpiece. Even in this case, the technical measure for soaking the rod-shaped workpiece is required to be examined.

Further, a material of the workpiece is appropriately selected in accordance with demanded characteristics. Conditions for properly heating the workpiece change in accordance with, for example, the material, a shape, and a size of the workpiece. In particular, the conditions depend greatly on the material of the workpiece. Thus, it is desired that at least an output from the heating coil be suitably adjustable.

In view of the actual circumstances described above, the present invention has an object to provide a technical measure, which is capable of inductively heating a rod-shaped workpiece to be subjected to a heat treatment in a predetermined mode while conveying the rod-shaped workpiece at a predetermined velocity along an axial direction of the rod-shaped workpiece and is capable of easily dealing with, for example, a model number change of the rod-shaped workpiece so as to enable mass production of high-quality mechanical components having a desired mechanical strength at low cost.

Solution to Problem

According to one embodiment of the present invention, which has been devised to achieve the above-mentioned object, there is provided a heat treatment method for a rod-shaped workpiece, comprising a heating step of inductively heating a rod-shaped workpiece having an outer peripheral surface with a circular cross section to a quenching temperature while conveying the rod-shaped workpiece at a predetermined velocity along an axial direction of the rod-shaped workpiece, wherein, in the heating step, the rod-shaped workpiece being currently conveyed is heated to a predetermined temperature equal to or lower than the quenching temperature by a first heating coil, which is electrically connected to a first high-frequency power supply to keep an output from the first heating coil constant, and then the rod-shaped workpiece being currently conveyed is heated to be maintained at the quenching temperature by a second heating coil, which is electrically connected to a second high-frequency power supply to keep an output from the second heating coil constant. The term "rod-shaped workpiece" in the present invention encompasses both a solid rod-shaped workpiece (for example, a columnar workpiece) and a hollow rod-shaped workpiece (for example, a cylindrical workpiece).

According to the method described above, the rod-shaped workpiece conveyed at the predetermined velocity (constant velocity) along the axial direction can be inductively heated to the predetermined temperature by the first heating coil and then soaked at the quenching temperature by the second heating coil. Specifically, the rod-shaped workpiece, which is continuously conveyed in the axial direction, can be inductively heated to obtain a temperature path shown in FIG. 7. As a result, the rod-shaped workpiece can be inductively heated to the quenching temperature in an efficient manner. Further, the first heating coil functioning as a temperature increasing coil and the second heating coil functioning as a soaking coil are electrically connected to the high-frequency power supplies in an individual manner. Therefore, the output from each of the heating coils can be easily and appropriately changed in accordance with, for example, a material of the rod-shaped workpiece to be subjected to heating (to be subjected to a heat treatment).

When the second heating coil that is longer than the first heating coil is used, the rod-shaped workpiece, which is currently conveyed, can be appropriately soaked.

It is preferred that the rod-shaped workpiece be conveyed at the predetermined velocity while being rotated about an axis thereof. In this manner, the rod-shaped workpiece can be heated to a uniform temperature throughout portions in a circumferential direction, the axial direction, and a depth direction (radial direction) of the rod-shaped workpiece.

When a plurality of rod-shaped workpieces are conveyed in a state of being separated from each other in the axial direction, the heating treatment can be performed efficiently on the plurality of rod-shaped workpieces. In addition, each of the rod-shaped workpieces can be heated with high accuracy without being thermally affected by the rod-shaped workpiece adjacent thereto.

The heat treatment method according to one embodiment of the present invention may further comprise a cooling step of cooling the rod-shaped workpiece discharged from the heating step. As a result, the rod-shaped workpiece can be appropriately quench-hardened.

The heat treatment method according to one embodiment of the present invention can be suitably used when the heat treatment is performed on the rod-shaped workpiece made of a steel material containing carbon at 0.8% by mass or more (for example, high carbon steel or alloy steel). As the rod-shaped workpiece, there is exemplified a roller for a roller bearing. The term "roller bearing" herein encompasses, for example, a cylindrical roller bearing, a tapered roller bearing, and a needle roller bearing. Therefore, the term "roller" encompasses, for example, a cylindrical roller, a tapered roller, and a needle roller.

Advantageous Effects of Invention

As described above, according to one embodiment of the present invention, the rod-shaped workpiece to be subjected to the heat treatment can be inductively heated in a predetermined mode while being conveyed at the predetermined velocity along a longitudinal direction of the rod-shaped workpiece. Besides, for example, the model number change of the rod-shaped workpiece can be easily dealt with. In this manner, the high-quality mechanical components having the desired mechanical strength can be mass-produced at low cost.

DESCRIPTION OF EMBODIMENTS

Now, description is made of embodiments of the present invention with reference to the drawings.

Figure 1:
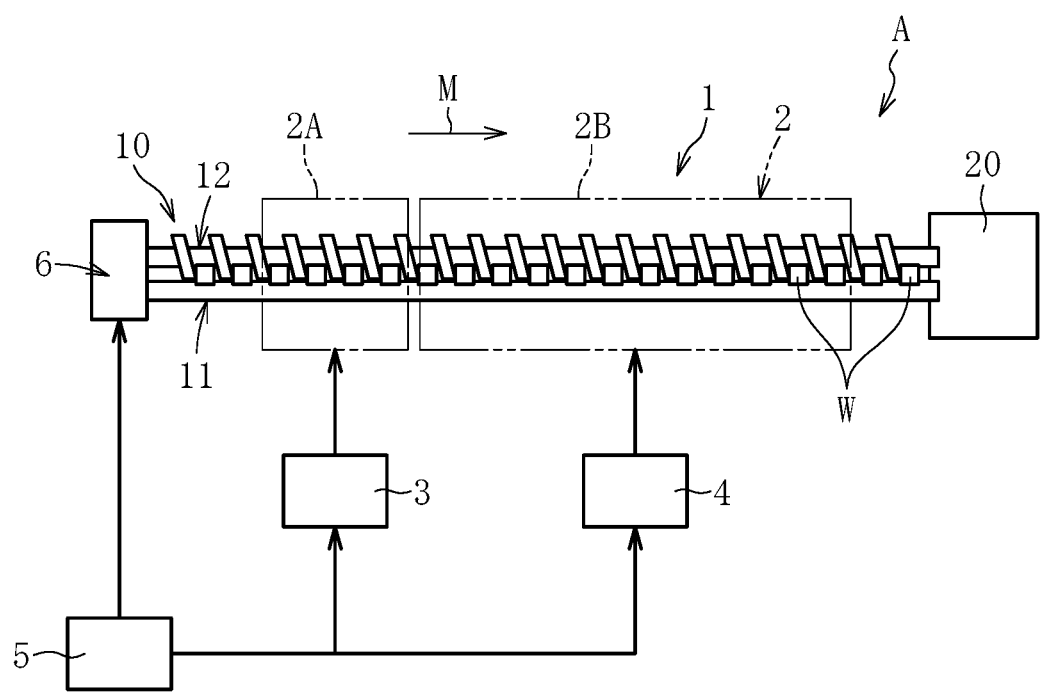
FIG. 1 is a plan view for schematically illustrating an overall structure of a heat treatment apparatus, which is to be used when a heat treatment method according to the present invention is carried out.

FIG. 1 is a plan view for schematically illustrating an overall structure of a heat treatment apparatus A, which is to be used when a heat treatment method according to the present invention is carried out. The heat treatment apparatus A illustrated in FIG. 1 is configured to perform quench hardening on a rod-shaped workpiece W made of steel, more specifically, for example, a solid rod-shaped workpiece (a base material for a tapered roller in this embodiment) W, which is made of a steel material containing carbon at 0.8% by mass or more (for example, SUJ2 or SUJ3, which is classified as high-carbon chromium bearing steel specified in JIS G4805) and has an outer peripheral surface with a circular cross section. The heat treatment apparatus A is configured to sequentially perform a heating step of heating the rod-shaped workpiece W to a predetermined temperature (quenching temperature) and a cooling step of cooling the rod-shaped workpiece W heated to the quenching temperature.

As illustrated in FIG. 1, the heat treatment apparatus A comprises an induction heating apparatus 1 and a cooling section 20. The induction heating apparatus 1 is configured to inductively heat the rod-shaped workpiece W, which is conveyed in a horizontal posture (laterally oriented posture) along an axial direction of the rod-shaped workpiece W (direction indicated by the arrow M in FIG. 1), to the quenching temperature. The cooling section 20 serving as a cooling device is configured to cool the rod-shaped workpiece W, which has been heated to the quenching temperature and has been discharged from the induction heating apparatus 1. The cooling section 20 is formed of, for example, a cooling liquid bath in which a cooling liquid such as quenching oil is stored.

The induction heating apparatus 1 comprises a conveying device 10 and a heating coil 2. The conveying device 10 is configured to convey the rod-shaped workpiece W in the horizontal posture at a predetermined velocity along the axial direction thereof. The heating coil 2 is configured to inductively heat the rod-shaped workpiece W, which is currently conveyed. The heating coil 2 comprises a first heating coil 2A and a second heating coil 2B, which are arranged in a row (arranged in series) in the axial direction. The first heating coil 2A is electrically connected to a first high-frequency power supply 3. The second heating coil 2B is electrically connected to a second high-frequency power supply 4. Both of the high-frequency power supplies 3 and 4 are electrically connected to a controller 5. The high-frequency power supply 3 is configured to supply a predetermined magnitude of power to the first heating coil 2A and the high-frequency power supply 4 is configured to supply a predetermined magnitude of power to the second heating coil 2B, based on signals output from the controller 5, respectively.

Figure 2:
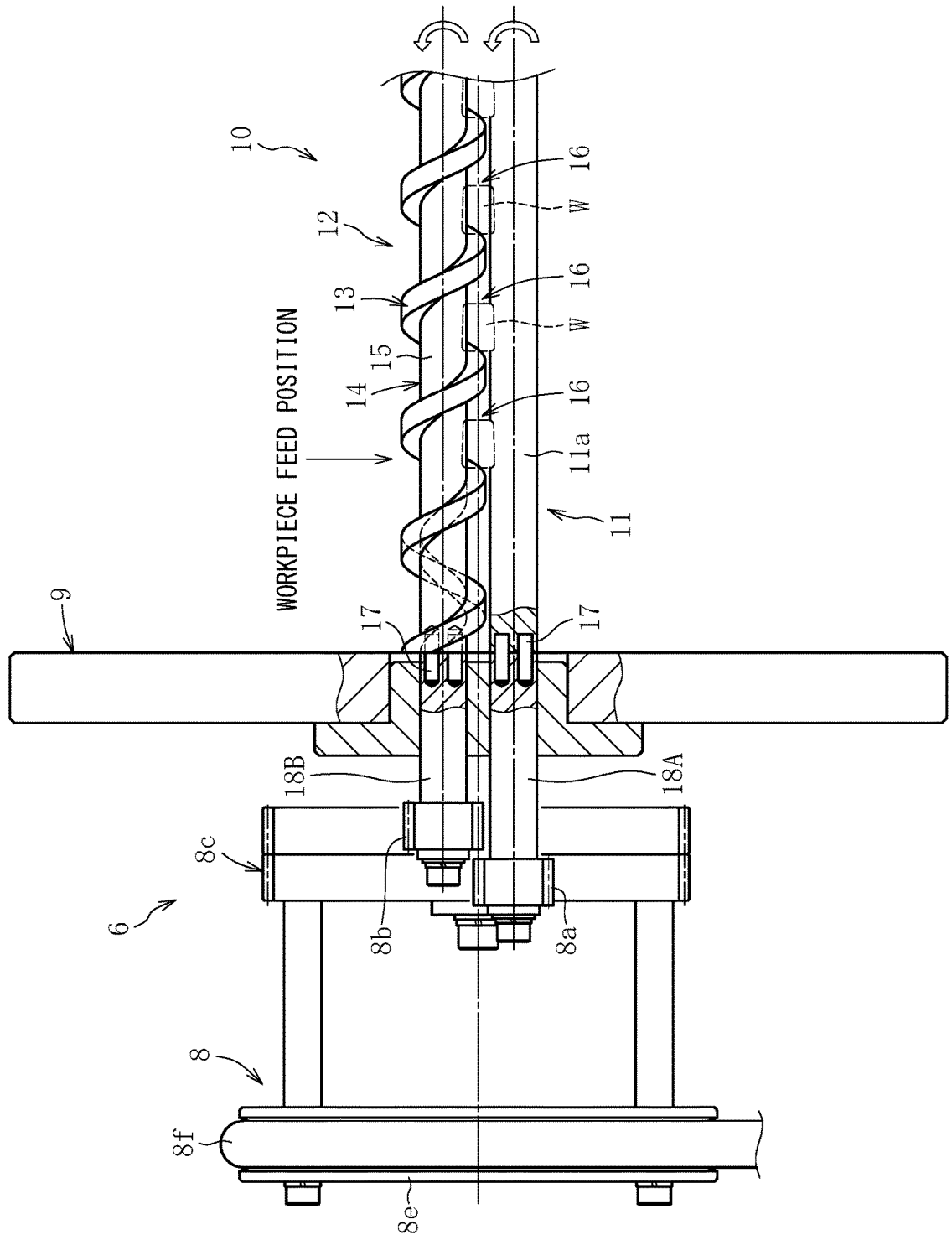
FIG. 2 is a partially enlarged plan view of an induction heating apparatus.
Figure 3:
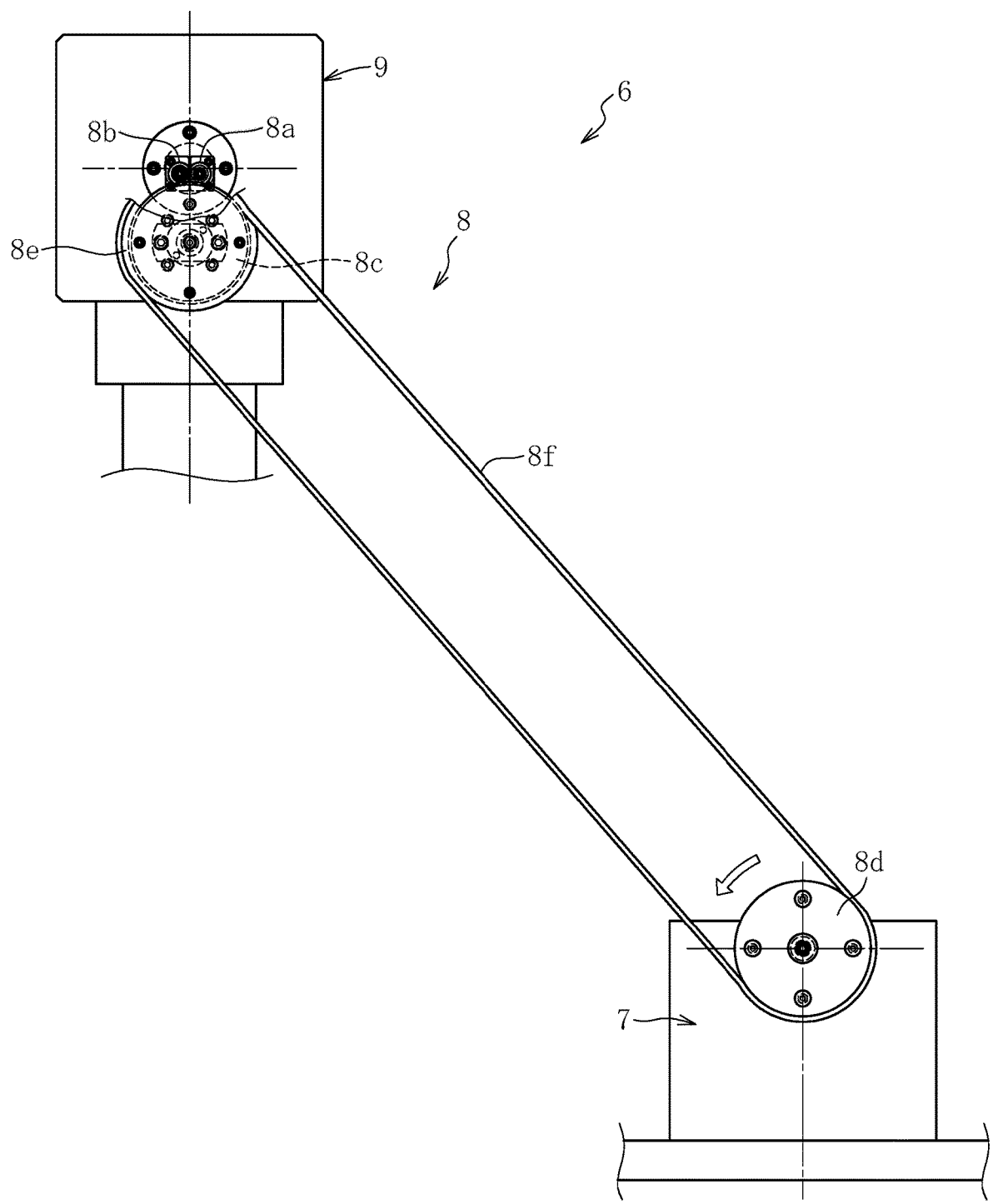
FIG. 3 is a schematic front view of the induction heating apparatus.

Although not specifically illustrated, each of the first heating coil 2A and the second heating coil 2B is formed of a helical coil formed by helically winding a tubular body made of a conductive metal (for example, a copper pipe) at a predetermined pitch and is supported on a frame body 9 (see FIG. 2 and FIG. 3). Each of the first heating coil 2A and the second heating coil 2B has an axial dimension (total length dimension) that is sufficiently longer than an axial dimension of the rod-shaped workpiece W. Therefore, a plurality of rod-shaped workpieces W can be inductively heated at the same time. In this embodiment, as the second heating coil 2B, a coil that is longer than the first heating coil 2A is used. More specifically, the second heating coil 2B having the axial dimension three times larger than the axial dimension of the first heating coil 2A is used.

Although not specifically illustrated, the induction heating apparatus 1 may comprise a cooling circuit configured to cool both of the heating coils 2A and 2B. When such cooling circuit described above is provided, temperatures of the heating coils 2A and 2B can be appropriately and efficiently controlled. Thus, the rod-shaped workpiece W can be inductively heated to a predetermined temperature in an accurate and efficient manner. The formation of the heating coil 2 of the tubular body allows the formation of the cooling circuit. The cooling circuit can be formed by, for example, connecting the heating coil 2, specifically, a hollow portion thereof, and a cooling liquid tank in which the cooling liquid is stored to each other through a pipe and providing a pump to the pipe.

The conveying device 10 in this embodiment is configured to continuously convey the rod-shaped workpiece W at a predetermined velocity (constant velocity) in the axial direction while rotating the rod-shaped workpiece W about an axis thereof. The conveying device 10 described above comprises, as illustrated in FIG. 2 and FIG. 4A, a first shaft member 11, a second shaft member 12, and a rotary mechanism 6. The first shaft member 11 and the second shaft member 12 are apart from each other and extend in parallel in the axial direction, and are configured to support the outer peripheral surfaces of the rod-shaped workpieces W from a lower side in a contact state in cooperation with each other. The rotary mechanism 6 is configured to rotate both the shaft members 11 and 12 about axes thereof. As illustrated in FIG. 4B, the shaft members 11 and 12 are disposed so that the axes (centers of rotation) of the two shaft members are positioned on the same plane. As illustrated in FIG. 1, each of the shaft members 11 and 12 is longer than the heating coil 2, and has one axial end and another axial end, which project outward from the heating coil 2.

As illustrated in FIG. 3, the rotary mechanism 6 comprises an electric motor 7 such as a servomotor and a power transmission mechanism 8. The power transmission mechanism 8 is configured to transmit rotary power of the electric motor 7 to both of the shaft members 11 and 12. The electric motor 7 is electrically connected to a power supply (not shown) and is driven to rotate at a predetermined rotation velocity based on the signal output from the controller. In this embodiment, as illustrated in FIG. 1, the controller 5, which outputs the control signal to each of the high-frequency power supplies 3 and 4, is configured to output the control signal also to the electric motor 7 of the rotary mechanism 6. However, a controller configured to output the control signal to the electric motor 7 can also be provided independently of the controller 5.

Figure 4A:
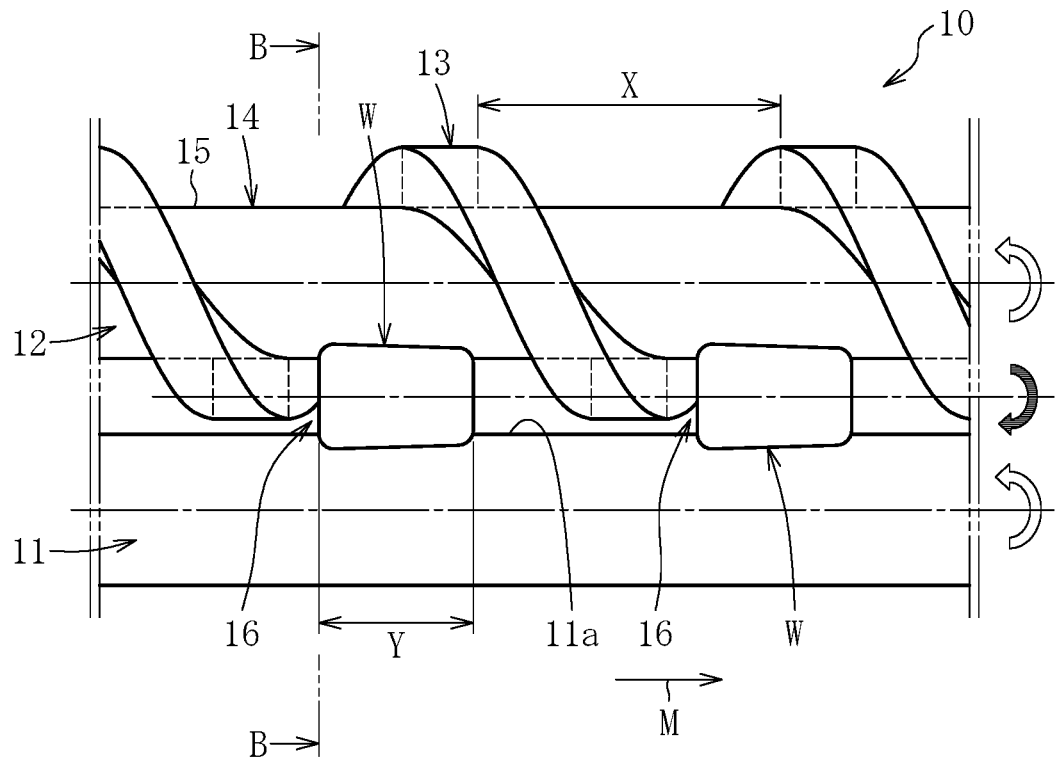
FIG. 4A is a partially enlarged plan view of a conveying device of the induction heating apparatus.
Figure 4B:
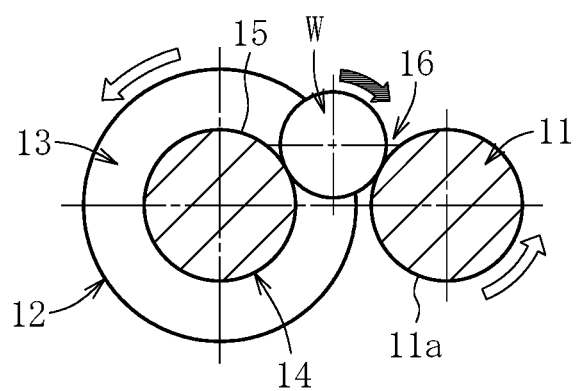
FIG. 4B is a schematic sectional view taken along the line B-B of FIG. 4A as seen in the direction indicated by the arrows.

As illustrated in FIG. 2, FIG. 4A, and FIG. 4B, the first shaft member 11 is formed of a solid columnar shaft having an outer peripheral surface 11a formed as a cylindrical surface having a constant diameter, whereas the second shaft member 12 is formed of a solid threaded shaft having a helical protruding portion 13 extending along an outer periphery thereof. Both of the shaft members 11 and 12 are made of a non-magnetic material. As the non-magnetic material, for example, ceramic (for example, alumina, zirconia, or silicon carbide) having a high hardness and an excellent heat resistance can be suitably used.

The outer peripheral surfaces of the rod-shaped workpieces W are supported by workpiece support portions 16 in a contact state. The workpiece support portions 16 are formed by cooperation between a groove bottom surface 15 of a helical groove 14 defined by the helical protruding portion 13 on the outer periphery of the second shaft member 12 and the cylindrical outer peripheral surface 11a of the first shaft member 11, which faces the groove bottom surface 15. In particular, when a groove width of the helical groove 14 (axial dimension of the groove bottom surface 15) is X, and an axial dimension of the rod-shaped workpiece W is Y, a pitch and a width dimension of the protruding portion 13 are set so as to satisfy a relational expression of Y<X. As described above, in the conveying device 10, the workpiece support portions 16, each being configured to support an outer peripheral surface of the rod-shaped workpiece W from a lower side in a contact state, are formed at a plurality of positions that are separated from each other in the axial direction by cooperation between the first shaft member 11 and the second shaft member 12. When, for example, a relational expression of X<2Y (Y<X<2Y) is satisfied, only the single rod-shaped workpiece W can be supported in each of the workpiece support portions 16 in a contact state. Specifically, the plurality of rod-shaped workpieces W can be conveyed in a state of being reliably separated from each other in the axial direction.

As illustrated in FIG. 2 and FIG. 3, the power transmission mechanism 8 in this embodiment comprises a gear shaft 18A, a gear shaft 18B, a large gear 8c, a drive pulley 8d, a driven pulley 8e, and an endless belt member 8f. The gear shaft 18A has a small gear 8a and is coupled to one axial end of the first shaft member 11 through intermediation of coupling pins 17. The gear shaft 18B has a small gear 8b and is coupled to one axial end of the second shaft member 12 through intermediation of the coupling pins 17. The large gear 8c is supported on the frame body 9 so as to be freely rotatable and meshes with both of the small gears 8a and 8b. The drive pulley 8d is coupled to an output shaft of the electric motor 7. The driven pulley 8e is coupled to the large gear 8c. The endless belt member 8f, which may also be a chain, is looped over outer peripheral surfaces of the pulleys 8d and 8e. A tooth flank pitch of the small gear 8a and a tooth flank pitch of the small gear 8b are the same. Further, a tooth flank pitch of part of the large gear 8c, which meshes with the small gear 8a, and a tooth flank pitch of part of the large gear 8c, which meshes with the small gear 8b, are the same. When the electric motor 7 is driven by the power transmission mechanism 8 (rotary mechanism 6) having the configuration described above, the first shaft member 11 and the second shaft member 12 are rotated at the same velocity in the same direction.

When the heat treatment apparatus A having the configuration described above is used, the quench hardening, which include the heating step and the cooling step, for the rod-shaped workpiece is carried out, for example, in the following mode.

Prior to carrying out the quench hardening (heating step), heating conditions for the rod-shaped workpiece W by the induction heating apparatus 1 are set. The heating conditions are set by setting a conveying velocity for the rod-shaped workpiece W (driving velocity of the conveying device 10), an output from the first heating coil 2A (a power supply amount from the first high-frequency power supply 3), and an output from the second heating coil 2B (a power supply amount from the second high-frequency power supply 4) based on a practical test or a simulation using analysis software. First, the output from the second heating coil 2B is set. Specifically, the output from the second heating coil 2B is set to such a given value that the temperature of the rod-shaped workpiece W, which has reached the quenching temperature, can be kept at the quenching temperature, specifically, the rod-shaped workpiece W can be soaked at the quenching temperature, when the rod-shaped workpiece W is conveyed (passes) through a region opposed to the second heating coil 2B. Next, the conveying velocity for the rod-shaped workpiece W is set so as to be able to ensure a time period for which the rod-shaped workpiece W should be soaked at the quenching temperature, specifically, a time period to allow a predetermined amount of carbon to be dissolved into a metallic structure of the rod-shaped workpiece W. Finally, the output from the first heating coil 2A is set to a given value so that the rod-shaped workpiece W is heated to a predetermined temperature equal to or lower than the quenching temperature while the rod-shaped workpiece W, which is conveyed at the set conveying velocity, is being conveyed through a region opposed to the first heating coil 2A.

The above-mentioned heating conditions can also be set in the order of the conveying velocity, the output from the second heating coil 2B, and the output from the first heating coil 2A. Although the above-mentioned heating-condition setting operation is carried out each time the rod-shaped workpiece W to be subjected to the heat treatment is changed, the heating conditions can be stored in the controller 5 (see FIG. 1) once after being set. Specifically, the heating conditions that are set in accordance with the kind of rod-shaped workpiece W can be stored in the controller 5. In this case, even when the rod-shaped workpiece W to be subjected to the heat treatment is changed, specifically, at the time of so-called model number change, the heating conditions can be quickly set.

After the heating conditions are set, both of the heating coils 2A and 2B are brought into an energized state. At the same time, after the conveying device 10 is brought into a driven state, the rod-shaped work W is fed to the conveying device 10. More specifically, the rod-shaped workpiece W is fed to (the workpiece support portion 16 of) the conveying device 10 from a workpiece feed position illustrated in FIG. 2 so that the outer peripheral surface of the rod-shaped workpiece W is supported in a contact state. The workpiece support portion 16 is formed by the groove bottom surface 15 of the helical groove 14, which is defined on the second shaft member 12, as described above. Therefore, while the conveying device 10 is being driven to cause both of the shaft members 11 and 12 to rotate about the axes thereof, a pressurizing force for pressuring the rod-shaped workpiece W from one axial end side toward another axial end side is continuously applied to the rod-shaped workpiece W. As a result, the rod-shaped workpiece W is conveyed at the predetermined velocity along the axial direction thereof. Then, along with the passage through the region opposed to the first heating coil 2A, the rod-shaped workpiece W is inductively heated to the predetermined temperature equal to or lower than the quenching temperature. Subsequently, while passing through the region opposed to the second heating coil 2B, the rod-shaped workpiece W is inductively heated so as to be kept at the quenching temperature for a predetermined time period.

The rod-shaped workpiece W, which has passed through the region opposed to the second heating coil 2B and has been discharged from the second heating coil 2B, is fed into the cooling liquid stored in the cooling section 20 (see FIG. 1) due to a free fall so as to be cooled to a temperature falling within a predetermined temperature range. As a result, the rod-shaped workpiece W is quench-hardened.

Figure 5:
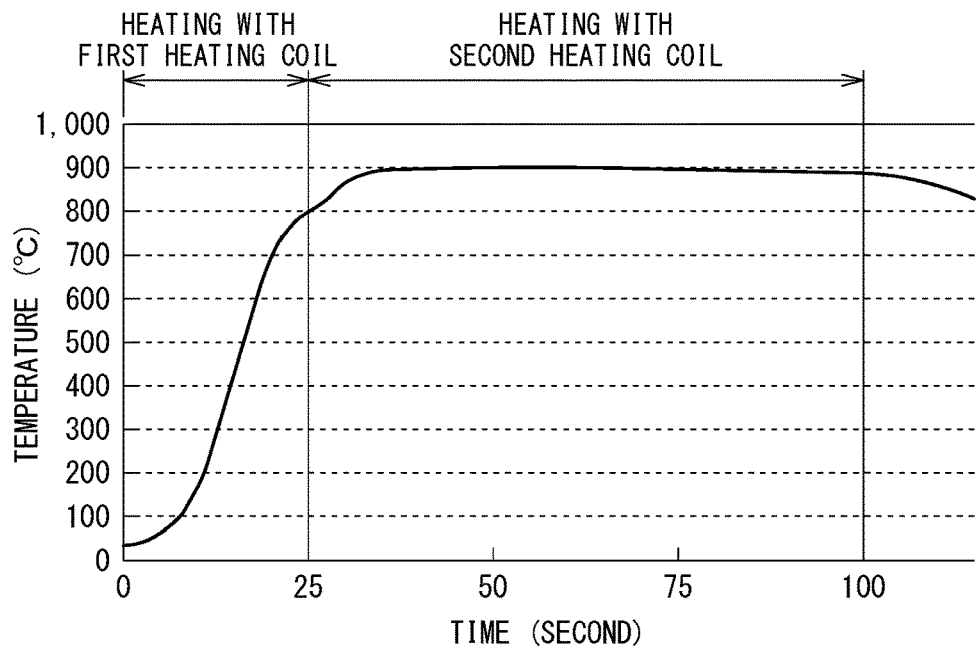
FIG. 5 is a graph for showing a temperature path of a rod-shaped workpiece when the present invention is applied.
Figure 7:
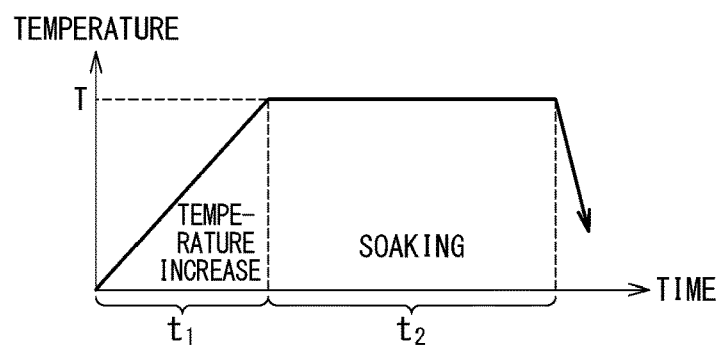
FIG. 7 is an explanatory graph for showing a desirable temperature path when the rod-shaped workpiece is heated.

When the rod-shaped workpiece W is inductively heated in the manner described above, the rod-shaped workpiece W, which is conveyed at the predetermined velocity (constant velocity) along the axial direction, can be inductively heated to the predetermined temperature equal to or lower than the quenching temperature by the first heating coil 2A and then be soaked at the quenching temperature by the second heating coil 2B. Specifically, the rod-shaped workpiece W, which is continuously conveyed along the axial direction, can be inductively heated so that a temperature path shown in FIG. 7 is obtained. As a result, the rod-shaped workpiece W can be inductively heated to the quenching temperature in an efficient manner. In practice, for example, when the method described above is used for inductively heating the rod-shaped workpiece W to about 900° C. as the quenching temperature, as shown in FIG. 5, it has been verified that the rod-shaped workpiece W can be heated so that a path approximating the temperature path shown in FIG. 7 is obtained.

Further, the first heating coil 2A functioning as a temperature increasing coil and the second heating coil 2B functioning as a soaking coil are electrically connected to the high-frequency power supplies 3 and 4 in an individual manner. Therefore, the output from each of the heating coils 2A and 2B can be easily and appropriately changed in accordance with, for example, a material of the rod-shaped workpiece W to be subjected to the heat treatment.

When the rod-shaped workpiece W is conveyed in the manner described above, the first shaft member 11 and the second shaft member 12, which form the workpiece support portion 16 therebetween, are rotated in the same direction. Therefore, a rotative force for rotating the rod-shaped workpiece W about the axis thereof, specifically, in a direction opposite to the rotating direction of the shaft members 11 and 12, is continuously applied to the rod-shaped workpiece W supported in the workpiece support portion 16, as indicated by the solid arrow in FIG. 4A and FIG. 4B.

Therefore, while the conveying device 10 is being driven, the pressurizing force for pressurizing the rod-shaped workpiece W along the axial direction and the rotative force for rotating the rod-shaped workpiece W about the axis thereof are continuously applied to the rod-shaped workpiece W, which is supported in the workpiece support portion 16 in a contact state. In other words, the rod-shaped workpiece W, which is conveyed by the conveying device 10, is inductively heated while being continuously rotated about the axis thereof. In this manner, each portion of the rod-shaped workpiece W can be inductively heated in a uniform manner without causing temperature unevenness in the rod-shaped workpiece W for which the heating has been completed. Therefore, after the rod-shaped workpiece W is cooled, the rod-shaped workpiece W of high quality, which has no difference in mechanical strength between portions in a circumferential direction and a cross-sectional direction, can be obtained.

In this embodiment, in particular, the power transmission mechanism 8 is configured so that a rotation velocity of the first shaft member 11 and a rotation velocity of the second shaft member 12, which form the workpiece support portion 16, become the same. Therefore, the rod-shaped workpiece W, which is supported in the workpiece support portion 16 in a contact state, can be continuously rotated in a smooth fashion. Further, both of the shaft members 11 and 12 are made of the non-magnetic material. Thus, cooling due to heat transfer can be prevented from occurring in contact portions between the rod-shaped workpiece W and the shaft members 11 and 12 as much as possible. Therefore, the occurrence of temperature unevenness in the rod-shaped workpiece W for which the heating has been completed can be further effectively prevented.

In the induction heating apparatus 1, specifically, the heat treatment apparatus A according to this embodiment, the rod-shaped workpieces W are fed one by one at predetermined intervals from the workpiece feed position illustrated in FIG. 2 to the conveying device 10. As a result, the plurality of rod-shaped workpieces W can be inductively heated in a simultaneous manner while being conveyed under a state in which the plurality of rod-shaped workpieces W are separated from each other in the axial direction. In this case, each of the rod-shaped workpieces W can be heated with high accuracy without being thermally affected by the rod-shaped workpiece W adjacent thereto.

An example of the embodiment of the present invention is described above in detail, but the embodiment of the present invention is not limited to that described above.

For example, as shown in FIG. 5, the output from the first heating coil 2A can be set so that the rod-shaped workpiece W is heated to the predetermined temperature (about 800° C. in the illustrated example) lower than the quenching temperature (900° C. in the illustrated example) while the rod-shaped workpiece W is passing through the region opposed to the first heating coil 2A. Besides, the output from the first heating coil 2A can be set so that the rod-shaped workpiece W is heated to about the quenching temperature while the rod-shaped workpiece W is passing through the region opposed to the first heating coil 2A.

Figure 6:
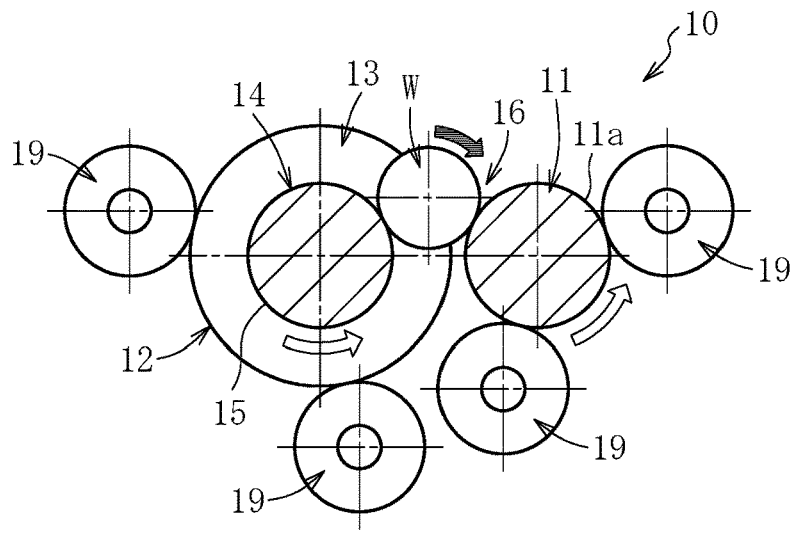
FIG. 6 is a schematic view for illustrating an example of a support mode of a first shaft member and a second shaft member of the conveying device.

Further, in particular, when there is a fear in that deflection may occur in the first shaft member 11 and the second shaft member 12, one or a plurality of support members (support rollers) 19 configured to support regions of outer peripheral surfaces of the shaft members 11 and 12 other than regions which form the workpiece support portions 16 in a contact state may be provided as illustrated in FIG. 6. The plurality of support members 19 are provided at a plurality of positions that are separated in the axial direction. When the support rollers 19 as described above are provided, the occurrence of the deflection in the shaft members 11 and 12 can be prevented as much as possible. Thus, the rod-shaped workpiece W can be supported and conveyed with high accuracy. Specifically, the rod-shaped workpiece W can be inductively heated with high accuracy.

Further, in the embodiment described above, the helical protruding portion 13 is formed on only one of the shaft members 11 and 12, specifically, on the second shaft member 12 so that the outer peripheral surface of the rod-shaped workpiece W is supported in a contact state by the cooperation between the groove bottom surface 15 of the helical groove 14 defined on the second shaft member 12 by the protruding portion 13 and the cylindrical outer peripheral surface 11a of the first shaft member 11, which is opposed thereto. However, the helical protruding portion 13 may also be formed on each of the first shaft member 11 and the second shaft member 12 so that the workpiece support portions 16 may be formed by the groove bottom surfaces 15 of the helical grooves 14 respectively formed on the shaft members 11 and 12.

In the embodiment described above, the rotation velocity of the shaft member 11 about the axis thereof and the rotation velocity of the shaft member 12 about the axis thereof are set to be the same so that the rod-shaped workpiece W is continuously rotated about the axis thereof in a smooth fashion. However, the rotation velocity of the shaft member 11 and the rotation velocity of the shaft member 12 may be set different from each other as long as the rod-shaped workpiece W can be rotated about the axis thereof. In order to set the rotation velocity of the shaft member 11 and the rotation velocity of the shaft member 12 different from each other, for example, the tooth flank pitch of the small gear 8a provided to the first shaft member 11 and the large gear 8c that meshes therewith and the tooth flank pitch of the small gear 8b provided to the second shaft member 12 and the large gear 8c that meshes therewith are only required to be set different from each other.

The rotary mechanism 6 described above is merely an example, and other rotary mechanisms 6 may be adopted. For example, two electric motors may be provided so that the first shaft member 11 is coupled to an output shaft of one of the electric motors and the second shaft member 12 is coupled to an output shaft of another one of the electric motors.

In the embodiment described above, the conveying device 10 having the configuration described above has been adopted so as to continuously convey the rod-shaped workpiece W along the axial direction while continuously rotating the rod-shaped workpiece W about the axis thereof. In particular, however, when the rod-shaped workpiece W is not required to be rotated about the axis thereof, a conveying device having other configurations, for example, a conveying conveyor may be adopted as the conveying device 10.

Although the present invention is applied for performing the heat treatment on the tapered roller as the rod-shaped workpiece W in the description given above, the present invention can be suitably used even when the heat treatment is performed on other mass-produced components including a cylindrical roller for a cylindrical roller bearing and a needle roller for a needle roller bearing. Further, the present invention can also be suitably applied not only to a case in which the solid rod-shaped workpiece W such as various rollers described above is inductively heated but also to a case in which the hollow rod-shaped workpiece W is inductively heated.

The present invention is not limited to the above-mentioned embodiment. The present invention may be carried out in various modes without departing from the spirit of the present invention. The scope of the present invention is defined in claims, and encompasses equivalents described in claims and all changes within the scope of claims.

REFERENCE SIGNS LIST 1 induction heating apparatus
2 heating coil
2A first heating coil
2B second heating coil
3 first high-frequency power supply
4 second high-frequency power supply
6 rotary mechanism
8 power transmission mechanism
10 conveying device
11 first shaft member 12 second shaft member
13 helical protruding portion
14 helical groove
15 groove bottom surface
16 workpiece support portion
20 cooling section (cooling device)
A heat treatment apparatus
W rod-shaped workpiece

The invention claimed is:

1. A heat treatment method for a rod-shaped workpiece, the heat treatment method comprising a heating step of inductively heating a rod-shaped workpiece having an outer peripheral surface with a circular cross section to a quenching temperature while conveying the rod-shaped workpiece at a predetermined velocity along an axial direction of the rod-shaped workpiece,
   wherein, in the heating step, the rod-shaped workpiece being conveyed is heated to a predetermined temperature equal to or lower than the quenching temperature by a first heating coil, which is electrically connected to a first high-frequency power supply to keep an output from the first heating coil constant, the first heating coil having an axial dimension that is longer than an axial dimension of the rod-shaped workpiece, and
   then the rod-shaped workpiece being conveyed is heated to be maintained at the quenching temperature by a second heating coil, which is electrically connected to a second high-frequency power supply to keep an output from the second heating coil constant, the second heating coil having an axial dimension that is longer than the axial dimension of the rod-shaped workpiece, and
   wherein the inductively heating of the rod-shaped workpiece heats a whole of the rod-shaped workpiece to the quenching temperature.

2. The heat treatment method for a rod-shaped workpiece according to claim 1, wherein the second heating coil is longer than the first heating coil.

3. The heat treatment method for a rod-shaped workpiece according to claim 1, wherein, in the heating step, the rod-shaped workpiece is conveyed while being rotated about an axis of the rod-shaped workpiece.

4. The heat treatment method for a rod-shaped workpiece according to claim 1, wherein, in the heating step, a plurality of the rod-shaped workpieces are conveyed in a state of being separated from each other in the axial direction of the rod-shaped workpieces.

5. The heat treatment method for a rod-shaped workpiece according to claim 1, further comprising a cooling step of cooling the rod-shaped workpiece discharged from the heating step.

6. The heat treatment method for a rod-shaped workpiece according to claim 1, wherein the rod-shaped workpiece is made of a steel material containing carbon at 0.8% by mass or more.

7. The heat treatment method for a rod-shaped workpiece according to claim 1, wherein the rod-shaped workpiece comprises a roller for a roller bearing.

* * * * *